United States Patent
Anderson et al.

(10) Patent No.: US 12,541,640 B2
(45) Date of Patent: Feb. 3, 2026

(54) COMPUTING DEVICE FOR MULTIPLE CELL LINKING

(71) Applicant: WORKIVA INC., Ames, IA (US)

(72) Inventors: Taylor Anderson, Ames, IA (US); Joshua Allen Beam, Columbus, GA (US); Brian David Bolton, Columbus, GA (US); Kaitlyn Alise Childers, Clayton, GA (US); Mark David Erickson, Ankeny, IA (US); Grant Nelson, Bozeman, MT (US); John Christopher Pillar, Midland, GA (US); Madelyn Renee Stephens, Denver, CO (US)

(73) Assignee: WORKIVA INC., Ames, IA (US)

( * ) Notice: Subject to any disclaimer, the term of this patent is extended or adjusted under 35 U.S.C. 154(b) by 0 days.

(21) Appl. No.: 16/871,512

(22) Filed: May 11, 2020

(65) Prior Publication Data

US 2021/0319172 A1  Oct. 14, 2021

Related U.S. Application Data

(63) Continuation-in-part of application No. 16/293,998, filed on Mar. 6, 2019, now Pat. No. 11,048,861, (Continued)

(51) Int. Cl.
*G06F 40/18* (2020.01)
*G06F 3/0481* (2022.01)
(Continued)

(52) U.S. Cl.
CPC .......... *G06F 40/18* (2020.01); *G06F 3/0481* (2013.01); *G06F 16/2246* (2019.01); *G06F 16/93* (2019.01)

(58) Field of Classification Search
CPC ...... G06F 40/18; G06F 16/93; G06F 16/2246; G06F 16/0481; G06F 3/0481
See application file for complete search history.

(56) References Cited

U.S. PATENT DOCUMENTS 4,807,182 A    2/1989  Queen
5,553,216 A *  9/1996  Yoshioka ............... G06F 16/93
                                                    715/260
(Continued)

OTHER PUBLICATIONS

ExtendOffice, How to insert multiple hyperlinks in a cell in Excel, https://web.archive.org/web/20150409040726/https://www.extendoffice.com/documents/excel/916-excel-insert-multiple-hyperlinks.html (Year: 2015).*

(Continued)

*Primary Examiner* — Stephen S Hong
*Assistant Examiner* — Carl E Barnes, Jr.
(74) *Attorney, Agent, or Firm* — Faegre Drinker Biddle & Reath LLP

(57) ABSTRACT

A method for rendering linked content in a first document having a table with a plurality of cells is described. A first user entry of a first link in a cell of the plurality of cells is received at a computing device. The first link refers to a first set of content having a source location that is external to the cell. The cell is displayed in a user interface that displays the first document. Displaying the cell includes retrieving, by the computing device, the first set of content using the first link. Displaying the cell also includes updating, by the computing device, the user interface to display, within the cell, both the first set of content and a second set of content that is distinct from the first set of content.

26 Claims, 10 Drawing Sheets

Related U.S. Application Data which is a continuation of application No. 16/191,821, filed on Nov. 15, 2018, now Pat. No. 10,325,014, which is a continuation-in-part of application No. 15/411,237, filed on Jan. 20, 2017, now Pat. No. 10,331,776, which is a continuation of application No. 15/049,221, filed on Feb. 22, 2016, now Pat. No. 9,552,343, which is a continuation of application No. 14/808,029, filed on Jul. 24, 2015, now Pat. No. 9,292,482.

(60) Provisional application No. 62/155,000, filed on Apr. 30, 2015.

(51) Int. Cl.
*G06F 3/16* (2006.01)
*G06F 16/22* (2019.01)
*G06F 16/93* (2019.01)

(56) References Cited

U.S. PATENT DOCUMENTS

| | | | |
|---|---|---|---|
| 5,729,730 A * | 3/1998 | Wlaschin | G06F 16/221 |
| 6,230,173 B1 | 5/2001 | Ferrel et al. | |
| 6,460,059 B1 | 10/2002 | Wisniewski | |
| 6,572,660 B1 | 6/2003 | Okamoto | |
| 6,701,485 B1 * | 3/2004 | Igra | G06F 40/18 |
| | | | 715/209 |
| 6,792,454 B2 | 9/2004 | Nakano et al. | |
| 6,848,077 B1 | 1/2005 | McBrearty et al. | |
| 7,124,362 B2 | 10/2006 | Tischer | |
| 7,249,314 B2 | 7/2007 | Walker et al. | |
| 7,424,671 B2 | 9/2008 | Elza et al. | |
| 7,496,837 B1 | 2/2009 | Larcheveque et al. | |
| 7,496,841 B2 | 2/2009 | Hadfiled et al. | |
| 7,587,471 B2 | 9/2009 | Yasuda et al. | |
| 7,631,255 B2 | 12/2009 | Weise et al. | |
| 7,984,371 B2 | 7/2011 | Zdenek | |
| 8,015,235 B1 | 9/2011 | Bauer et al. | |
| 8,108,464 B1 | 1/2012 | Rochelle et al. | |
| 8,332,747 B2 | 12/2012 | Carro et al. | |
| 8,412,813 B2 | 4/2013 | Carlson et al. | |
| 8,555,161 B2 | 10/2013 | Parker | |
| 8,595,620 B2 | 11/2013 | Larsen et al. | |
| 8,656,290 B1 | 2/2014 | Greenspan et al. | |
| 8,825,594 B2 | 9/2014 | Skaria et al. | |
| 9,015,301 B2 | 4/2015 | Redlich et al. | |
| 9,152,686 B2 | 10/2015 | Whitehead et al. | |
| 9,251,235 B1 * | 2/2016 | Hurst | G06F 16/275 |
| 9,292,366 B2 | 3/2016 | Carro et al. | |
| 9,292,482 B1 * | 3/2016 | Thiesen | G06F 16/93 |
| 9,552,343 B2 | 1/2017 | Thiesen et al. | |
| 10,133,708 B2 | 11/2018 | Carro et al. | |
| 10,140,269 B2 | 11/2018 | Vogel et al. | |
| 10,223,340 B2 | 3/2019 | Soni | |
| 10,325,014 B2 | 6/2019 | Nelson et al. | |
| 10,331,776 B2 | 6/2019 | Thiesen et al. | |
| 10,635,744 B2 | 4/2020 | Beth et al. | |
| 10,878,182 B2 | 12/2020 | Thiesen et al. | |
| 10,902,185 B1 | 1/2021 | Cairns | |
| 10,936,808 B2 | 3/2021 | Soni | |
| 10,956,446 B1 | 3/2021 | Hurst | |
| 11,048,885 B2 | 6/2021 | Liu et al. | |
| 2002/0049697 A1 | 4/2002 | Nakano et al. | |
| 2002/0065848 A1 | 5/2002 | Walker et al. | |
| 2003/0112273 A1 | 6/2003 | Hadfield et al. | |
| 2003/0121008 A1 | 6/2003 | Tischer | |
| 2004/0024752 A1 | 2/2004 | Manber et al. | |
| 2005/0132070 A1 | 6/2005 | Redlich et al. | |
| 2005/0149851 A1 | 7/2005 | Mittal | |
| 2006/0271868 A1 | 11/2006 | Sullivan et al. | |
| 2007/0055989 A1 * | 3/2007 | Shanks | G07F 17/32 |
| | | | 725/135 |
| 2007/0186157 A1 | 8/2007 | Walker et al. | |
| 2007/0220415 A1 | 9/2007 | Cheng et al. | |
| 2007/0245409 A1 | 10/2007 | Harris et al. | |
| 2008/0005164 A1 | 1/2008 | Yee et al. | |
| 2008/0114720 A1 | 5/2008 | Smith et al. | |
| 2008/0177825 A1 | 7/2008 | Dubinko et al. | |
| 2008/0300864 A1 | 12/2008 | Smith | |
| 2009/0044283 A1 | 2/2009 | Yoshihama | |
| 2009/0063949 A1 | 3/2009 | Duan | |
| 2009/0094242 A1 | 4/2009 | Lo et al. | |
| 2009/0182763 A1 | 7/2009 | Hawking | |
| 2009/0199090 A1 | 8/2009 | Poston et al. | |
| 2010/0058176 A1 | 3/2010 | Carro et al. | |
| 2011/0106795 A1 | 5/2011 | Maim | |
| 2012/0030563 A1 | 2/2012 | Lemonik et al. | |
| 2012/0151312 A1 | 6/2012 | Clee et al. | |
| 2012/0173612 A1 | 7/2012 | Vegesna-Venkata et al. | |
| 2012/0331379 A1 | 12/2012 | Carro et al. | |
| 2014/0047327 A1 | 2/2014 | Larsen et al. | |
| 2014/0082470 A1 * | 3/2014 | Trebas | G06F 40/197 |
| | | | 715/217 |
| 2014/0129645 A1 | 5/2014 | Mo | |
| 2014/0136936 A1 * | 5/2014 | Patel | G06F 16/972 |
| | | | 715/212 |
| 2014/0181016 A1 | 6/2014 | Whitehead et al. | |
| 2014/0245257 A1 | 8/2014 | Kusmer et al. | |
| 2014/0281870 A1 | 9/2014 | Vogel et al. | |
| 2015/0058449 A1 | 2/2015 | Garg et al. | |
| 2015/0100594 A1 * | 4/2015 | Hess | G06Q 10/10 |
| | | | 707/755 |
| 2015/0199270 A1 | 7/2015 | Day-Richter et al. | |
| 2016/0041963 A1 | 2/2016 | Coblenz et al. | |
| 2016/0162461 A1 | 6/2016 | Simon et al. | |
| 2016/0344667 A1 | 11/2016 | Lane et al. | |
| 2016/0378737 A1 | 12/2016 | Keslin et al. | |
| 2017/0132188 A1 | 5/2017 | Thiesen et al. | |
| 2017/0220546 A1 | 8/2017 | Codrington et al. | |
| 2017/0308511 A1 | 10/2017 | Beth et al. | |
| 2018/0165260 A1 | 6/2018 | Soni | |
| 2019/0102370 A1 | 4/2019 | Nelson et al. | |
| 2020/0250383 A1 | 8/2020 | Cheng | |
| 2021/0064817 A1 | 3/2021 | Deering et al. | |
| 2021/0081605 A1 | 3/2021 | Smith et al. | |

OTHER PUBLICATIONS

Rodcastmath, Formatting Cell for currency and the auto sum function, youtube; https://www.youtube.com/watch?v=uS5XuYFHdKU (Year: 2012).*

Microsoft, "Create an external reference (link) to a cell range in another workbook," Excel for Microsoft 365, Excel 2019, Excel 2016, Excel 2013, Excel 2010 Support Office, 2020, retrieved from internet at <https://support.office.com/en-us/article/create-an-external-reference-link-to-a-cell-range-in-another-workbook-c98d1803-dd75-4668-ac6a-d7cca2a9b95f> on May 5, 2020, 8 pages.

Microsoft, "Create or change a cell reference," Excel for Microsoft 365, Excel for the web, Excel 2019, Excel 2016 Support Office, 2020, retrieved from internet at <https://support.office.com/en-us/article/create-or-change-a-cell-reference-c7b8b95d-c594-4488-947e-c835903cebaa> on May 5, 2020, 8 pages.

Notice of Allowance issued in related U.S. Appl. No. 17/175,910, May 17, 2021, 22 pages.

Grishchenko, "Deep Hypertext with Embedded Revision Control Implemented in regular Expressions," Proceedings of the 6th International Symposium on Wikis and Open Collaboration, ACM, 2010, 10 pages.

Grishchenko et al., "Referencing within evolving hypertext," Second international Workshop on Dynamic and Adaptive Hypertext, 2011, 12 pages.

Ignat et al., "Tree-based model algorithm for maintaining consistency in real-time collaborative editing systems," The Fourth International Workshop on Collaborative Editing Systems, CSCW 2002, New Orleans, USA, Nov. 2002, 8 pages.

* cited by examiner

FIG. 3  300 ⟶  302 ↙

| | A | B | C |
|---|---|---|---|
| 16 | LIABILITIES AND STOCKHOLDERS' EQUITY | | |
| 17 | Current Liabilities: | | |
| 18 | Accounts Payable | 6,539 | 5,954 |
| 19 | Accrued Salaries and Related Expenses | 1,623 | 1,469 |
| 20 | Sales Taxes Payable | 583 | 477 |
| 21 | Deferred Revenue | 1,061 | 1,164 |
| 22 | Income Taxes Payable | 148 | 156 |
| 23 | Current Installment of Long-Term Debt | 3,112 | 2,890 |
| 24 | Other Accrued Expenses | 505 | 133 |
| 25 | Total Current Liabilities | 13,571 | 12,243 |
| 26 | Long-Term Debt, excluding current installments | 7,958 | 9,558 |
| 27 | Other Long-Term Liabilities | 3,120 | 3,375 |
| 28 | Deferred Income Taxes | 420 | 454 |
| 29 | Total Liabilities | 25,069 | 25,990 |
| 30 | 304        STOCKHOLDERS' EQUITY | | |
| 31 | Current Period Common Stock, par value $0.01; Current Period Shares authorized: 1 billion shares; issued: shares at September 30, 2019 and 1.749 billion shares at September 30, 2018; outstanding: 1.511 billion shares at September 30, 2019 and 1.45 billion shares at September 30, 2018 | 89 | 88 |
| 32 | Paid-In Capital | 8,302 | 6,723 |
| 33 | Retained Earnings | 20,528 | 20,328 |
| 34 | Accumulated Other Comprehensive Income | 502 | 389 |
| 35 | Treasury Stock, at cost, 174 million shares at September 30, 2019 and 162 million shares at September 30, 2018 | (12,333) | (8,248) |
| 36 | Total Stockholders' Equity | 17,088 | 10,280 |
| 37 | Total Liabilities and Stockholders' Equity | $ 42,157 | $ 45,270 |

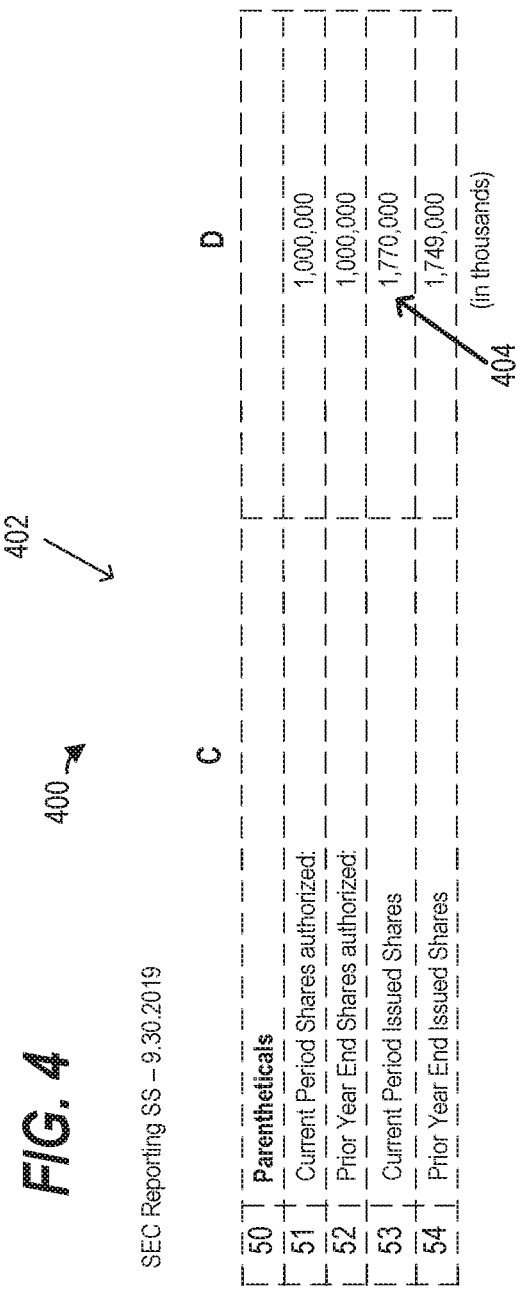

FIG. 5

| | A | B | C |
|---|---|---|---|
| 16 | LIABILITIES AND STOCKHOLDERS' EQUITY | | |
| 17 | Current Liabilities: | | |
| 18 | Accounts Payable | 6,539 | 5,954 |
| 19 | Accrued Salaries and Related Expenses | 1,623 | 1,469 |
| 20 | Sales Taxes Payable | 583 | 477 |
| 21 | Deferred Revenue | 1,061 | 1,164 |
| 22 | Income Taxes Payable | 148 | 156 |
| 23 | Current Installment of Long-Term Debt | 3,112 | 2,890 |
| 24 | Other Accrued Expenses | 505 | 133 |
| 25 | Total Current Liabilities | 13,571 | 12,243 |
| 26 | Long-Term Debt, excluding current installments | 7,958 | 9,558 |
| 27 | Other Long-Term Liabilities | 3,120 | 3,375 |
| 28 | Deferred Income Taxes | 420 | 454 |
| 29 | Total Liabilities | 25,069 | 25,990 |
| 30 | STOCKHOLDERS' EQUITY | | |
| 31 | Current Period Common Stock, par value $0.01; Current Period Shares authorized: 1 billion shares; issued: 1.77 billion shares at September 30, 2019 and 1.749 billion shares at September 30, 2018; outstanding: 1.511 billion shares at September 30, 2019 and 1.45 billion shares at September 30, 2018 | 89 | 88 |
| 32 | Paid-In Capital | 8,302 | 6,723 |
| 33 | Retained Earnings | 20,528 | 20,328 |
| 34 | Accumulated Other Comprehensive Income | 502 | 389 |
| 35 | Treasury Stock, at cost, 174 million shares at September 30, 2019 and 162 million shares at September 30, 2018 | (12,333) | (8,248) |
| 36 | Total Stockholders' Equity | 17,088 | 10,280 |
| 37 | Total Liabilities and Stockholders' Equity | $ 42,157 | $ 45,270 |

FIG. 7

| | A | B | C |
|---|---|---|---|
| 16 | LIABILITIES AND STOCKHOLDERS' EQUITY | | |
| 17 | Current Liabilities: | | |
| 18 | Accounts Payable | 6,539 | 5,954 |
| 19 | Accrued Salaries and Related Expenses | 1,623 | 1,469 |
| 20 | Sales Taxes Payable | 583 | 477 |
| 21 | Deferred Revenue | 1,061 | 1,164 |
| 22 | Income Taxes Payable | 148 | 156 |
| 23 | Current Installment of Long-Term Debt | 3,112 | 2,890 |
| 24 | Other Accrued Expenses | 505 | 133 |
| 25 | Total Current Liabilities | 13,571 | 12,243 |
| 26 | Long-Term Debt, excluding current installments | 7,958 | 9,558 |
| 27 | Other Long-Term Liabilities | 3,120 | 3,375 |
| 28 | Deferred Income Taxes | 420 | 454 |
| 29 | Total Liabilities | 25,069 | 25,990 |
| 30 | 304    STOCKHOLDERS' EQUITY | | |
| 31 | Current Period Common Stock, par value $0.01; Current Period Shares authorized: 1 billion shares; issued: 1.77 billion shares at September 30, 2019 and 1.749 billion shares at September 30, 2018; outstanding: 1.511 billion shares at September 30, 2019 and 1.45 billion shares at September 30, 2018 | | |
| 32 | Paid-In Capital | | |
| 33 | Retained Earnings | | |
| 34 | Accumulated Other Comprehensive Income | | |
| 35 | Treasury Stock, at cost, 174 million shares at September 30, 2019 and 162 million shares at September 30, 2018 | | |
| 36 | Total Stockholders' Equity | | |
| 37 | Total Liabilities and Stockholders' Equity | | |

Link Properties
A31
> ☐ 1.77 ← 712
> ☐ 1.749
> ☐ 1.511
> ☐ 1
> ☐ $0.01
> ☐ September 30, 2019
> ☐ September 30, 2018

FIG. 8

| | A | B | C |
|---|---|---|---|
| 16 | LIABILITIES AND STOCKHOLDERS' EQUITY | | |
| 17 | Current Liabilities: | | |
| 18 | Accounts Payable | 6,539 | 5,954 |
| 19 | Accrued Salaries and Related Expenses | 1,623 | 1,469 |
| 20 | Sales Taxes Payable | 583 | 477 |
| 21 | Deferred Revenue | 1,061 | 1,164 |
| 22 | Income Taxes Payable | 148 | 156 |
| 23 | Current Installment of Long-Term Debt | 3,112 | 2,890 |
| 24 | Other Accrued Expenses | 505 | 133 |
| 25 | Total Current Liabilities | 13,571 | 12,243 |
| 26 | Long-Term Debt, excluding current installments | 7,958 | 9,558 |
| 27 | Other Long-Term Liabilities | 3,120 | 3,375 |
| 28 | Deferred Income Taxes | 420 | 454 |
| 29 | Total Liabilities | 25,069 | 25,990 |
| 30 | STOCKHOLDERS' EQUITY | | |
| 31 | Current Period Common Stock, par value $0.01; Current Period Shares authorized: 1 billion shares; issued: 1.77 billion shares at September 30, 2019 and 1.749 billion shares at September 30, 2018; outstanding: 1.511 billion shares at September 30, 2019 and 1.45 billion shares at September 30, 2018 | | |
| 32 | Paid-In Capital | | |
| 33 | Retained Earnings | | |
| 34 | Accumulated Other Comprehensive Income | | |
| 35 | Treasury Stock, at cost, 174 million shares at September 30, 2019 and million shares at September 30, 2018 | | |
| 36 | Total Stockholders' Equity | | |
| 37 | Total Liabilities and Stockholders' Equity | | |

Link Properties
A31

∨ ☐ 1.77 ← 712

SOURCE
 SEC Reporting SS – 9.30.2019
 D53 / Dates and General

DESTINATIONS (1)
 ABC 10-K
 A31 / Consolidated Balance...

COMPUTING DEVICE FOR MULTIPLE CELL LINKING

CROSS-REFERENCES TO RELATED APPLICATIONS

This application is a continuation-in-part of U.S. application Ser. No. 16/293,998 (now U.S. Pat. No. 11,048,861), filed Mar. 6, 2019, which is a continuation of U.S. application Ser. No. 16/191,821 (now U.S. Pat. No. 10,325,014), filed Nov. 15, 2018, which is a continuation in part of U.S. application Ser. No. 15/411,237, filed Jan. 20, 2017 (now U.S. Pat. No. 10,331,776), which is a continuation of U.S. Application No. 15/049,221, filed Feb. 22, 2016 (now U.S. Pat. No. 9,552,343), which is a continuation of U.S. application Ser. No. 14/808,029, filed Jul. 24, 2015 (now U.S. Pat. No. 9,292,482), which claims the priority benefit of U.S. Provisional Patent Application No. 62/155,000, entitled "SYSTEM AND METHOD FOR CONVERGENT DOCUMENT COLLABORATION," filed on Apr. 30, 2015. The disclosures of each of the above-listed applications are incorporated herein by reference in their entirety.

TECHNICAL FIELD

Embodiments disclosed herein generally relate to a computing device for displaying a document, and more specifically to a computing device for rendering linked content in displayed documents.

BACKGROUND

1. Technical Field

Various embodiments disclosed herein relate to a method and apparatus for rendering linked content in a first document having a table with a plurality of cells.

2. Related Art

An electronic document typically includes content such as tables, images, text, etc. When that content is to be used in several different documents, it is often cumbersome and error-prone to copy the data among the different locations. In some scenarios, instead of copying the content to a new location, it is beneficial to insert a link to the content and retrieve the content as it is needed. However, the content of a cell within a spreadsheet is generally unable to store more than a link itself, so that providing both linked content and additional content within a same cell is challenging.

SUMMARY

In an embodiment, a method for rendering linked content in a first document having a table with a plurality of cells includes: receiving, at a computing device, a first user entry of a first link in a cell of the plurality of cells, wherein the first link refers to a first set of content having a source location that is external to the cell; displaying, by the computing device, the cell in a user interface that displays the first document, including: retrieving, by the computing device, the first set of content using the first link; and updating, by the computing device, the user interface to display, within the cell, both the first set of content and a second set of content that is distinct from the first set of content.

In another embodiment, a computing device comprises a processor configured to carry out a method for rendering linked content in a first document having a table with a plurality of cells. The method includes: receiving, at the computing device, a first user entry of a first link in a cell of the plurality of cells, wherein the first link refers to a first set of content having a source location that is external to the cell; displaying, by the computing device, the cell in a user interface that displays the first document, including: retrieving, by the computing device, the first set of content using the first link; and updating, by the computing device, the user interface to display, within the cell, both the first set of content and a second set of content that is distinct from the first set of content.

BRIEF DESCRIPTION OF THE DRAWINGS

The features and advantages of the disclosure will become more apparent by describing in detail exemplary embodiments thereof with reference to the attached drawings, in which:

FIG. 3 is a screen shot diagram of a user interface illustrating a first document having a table with a plurality of cells, according to an embodiment.

FIG. 4 is a screen shot diagram of a user interface illustrating a second document having a first set of content to be linked to the first document of FIG. 3, according to an embodiment.

FIG. 5 is a screen shot diagram of a user interface illustrating the first document of FIG. 3 with the first set of content from the second document of FIG. 4, according to an embodiment.

FIG. 7 is a screen shot diagram of a user interface illustrating the first document of FIG. 3 with a link properties box, according to an embodiment.

FIG. 8 is a screen shot diagram of a user interface illustrating the first document of FIG. 3 with the link properties box of FIG. 7, according to an embodiment.

FIG. 9 is a diagram of an example causal tree that includes a linking data structure, according to an embodiment.

DETAILED DESCRIPTION

As described herein, various embodiments relate to a system and method for rendering linked content in documents. In an embodiment, the system and method are used to insert, store, and update links to external content in a displayed document, including but not limited to spreadsheets, content in presentations, graphic components in flow charts and diagrams. The system and method are also used to insert, store, and update links made in a document by multiple users. In various embodiments, a computing device provides a user interface to a user of a document, where the user interface is configured to receive a user entry of a link that refers to content that is external to the cell, for example, content that is located in a different cell or even a different document. To display a cell that includes the linked content, the computing device retrieves the content using the link and updates the user interface to display, within the cell, both the linked content and other content that is distinct from the linked content. Advantageously, the computing device is configured to display the linked content itself (i.e., not just the link) and the other content in an editing mode of the user interface, for example, while the user is editing the contents of the cell.

Figure 1:
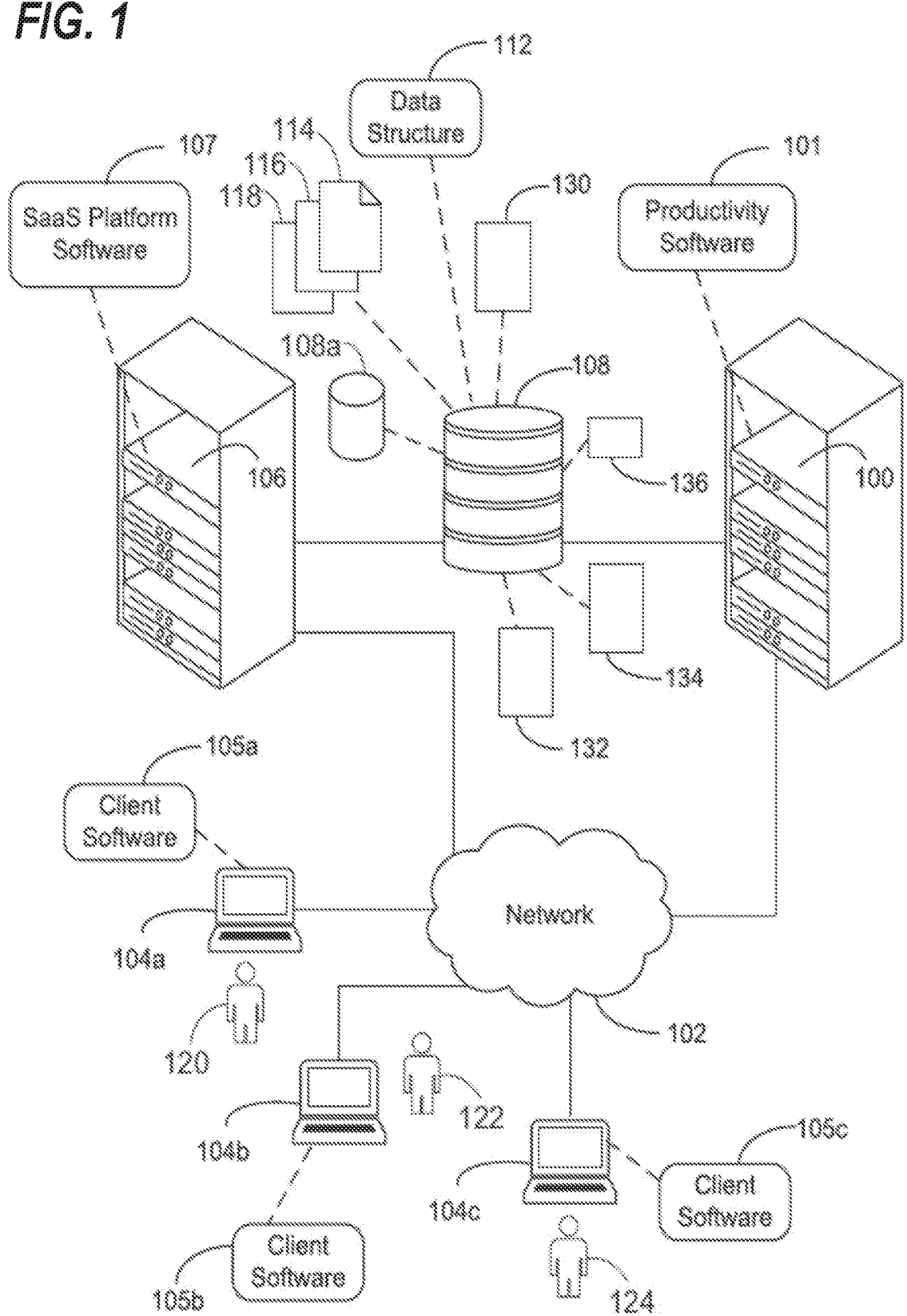
FIG. 1 is an example of a networking environment in which various embodiments of the disclosure may be implemented.

Turning to FIG. 1, an example of a computer networking environment in which various embodiments of the disclosure may be implemented is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104a, a third computing device 104b, a fourth computing device 104c, and a fifth computing device 106. The fifth computing device 106 is communicatively linked to a media storage device 108 (e.g., a redundant array of independent disks). For the sake of example, it is assumed that a first user 120 operates the second computing device 104a, a second user 122 operates the third computing device 104b, and a third user 124 operates the fourth computing device 104c. Each of the computing devices 104a, 104b, and 104c executes client software (reference numerals 105a, 105b, and 105c, respectively). One possible implementation of the client software is a web browser.

Residing within the media storage device 108 is a database 108a containing multiple documents, three of which are depicted in FIG. 1: a first document 114, a second document 116, and a third document 118. The first computing device 100 and the fifth computing device 106 are depicted as rack-mounted servers, while the second, third, and fourth computing devices 104a, 104b, and 104c are depicted as a notebook computers. However, the computing devices depicted in FIG. 1 are merely representative. Other possible implementations of a computing device include a desktop computer, a tablet computing, and a smartphone. Furthermore, although the first, second, and third documents 114, 116, and 118 are depicted as being stored in a single device, they may, in fact, be stored on multiple storage devices (e.g., sharded into multiple physical chunks) of a cloud storage service. Finally, there may be more than or fewer than the first, second, and third documents 114, 116, and 118 residing on the media storage device 108.

For convenient reference, the first computing device 100 will also be referred to as a "productivity server 100" and the fifth computing device 106 will be also be referred to as a "database server 106." Although depicted in FIG. 1 as separate devices, in some embodiments, the functionality of the productivity server 100 and the database server 106 are on the same device. The productivity server 100 executes productivity software 101 to provide document collaboration services. The database server 106 executes Software-as-a-Service ("SaaS") platform software 107 to provide database services to the productivity software 101, such as maintaining the contents of the database 108a and providing a programming platform for various processes launched by the productivity software (e.g., to manipulate, store, and retrieve documents and other information from the database 108a). Under the control of the productivity software 101, the productivity server 100 interacts with the database server 106 (which operates under the control of the SaaS platform software 107) and the computing devices 104a, 104b, and 104c (also referred to as "client devices") to allow the computing devices to access the first document 114, the second document 116, and the third document 118 so that the first user 120, the second user 122, and the third user 124 can collaborate in editing the documents (e.g., moving sections around in a particular document).

In an embodiment, documents maintained on the media storage device 108 may be organized into sections, with each section (e.g., the contents of the section) being maintained in its own separate data structure referred to as a "section entity." For example, the first document 114 in FIG. 1 has a first section represented by a first section entity 130, a second section represented by a second section entity 132, and a third section represented by a third section entity 134. The productivity software 101 uses an outline entity 136 (also stored on the media storage device) to determine how the sections are organized. As will be described below, the outline entity 136 may be implemented as a causal tree.

Figure 2:
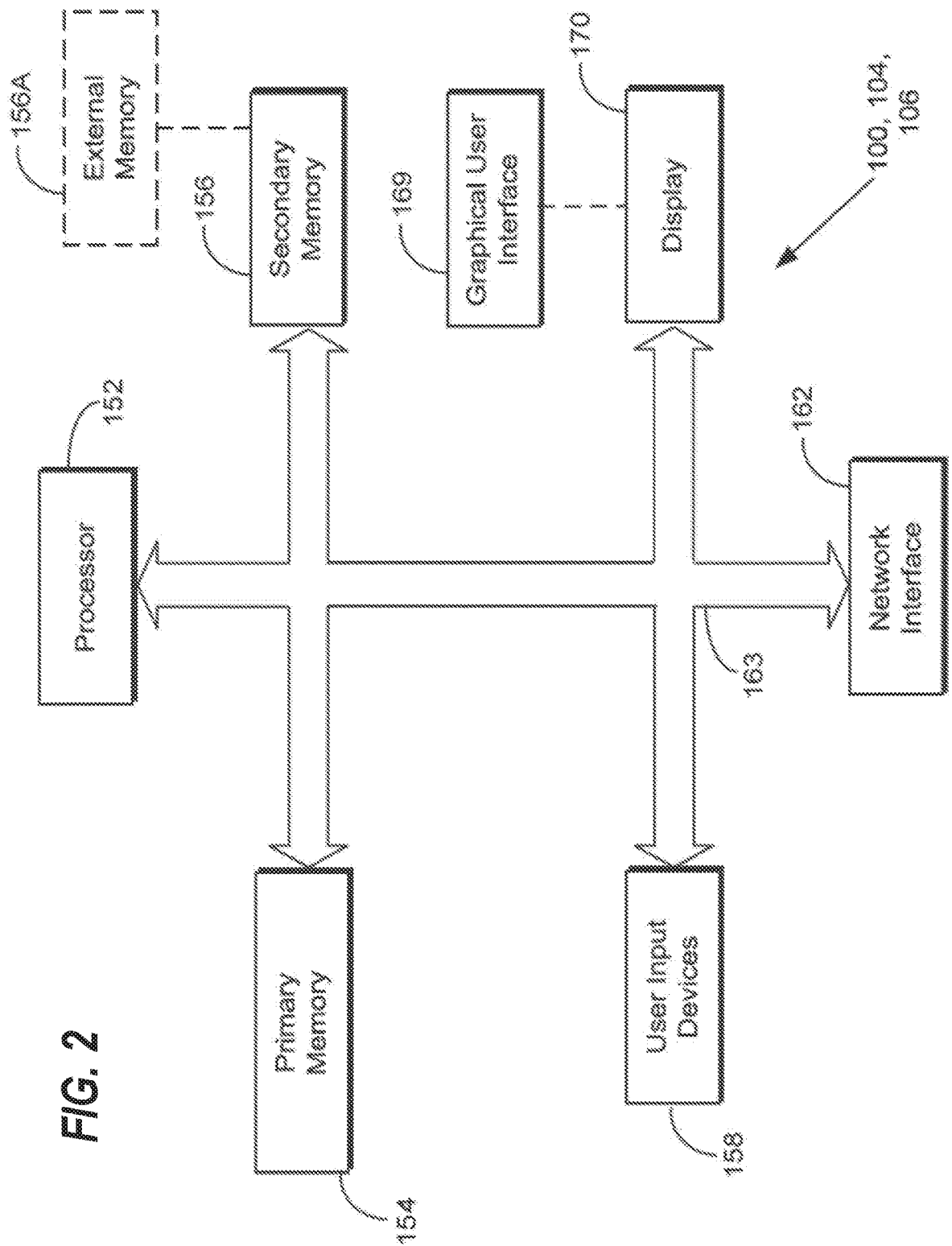
FIG. 2 is a block diagram of a computing device according to an embodiment.

FIG. 2 is a block diagram of a computing device, according to an embodiment. One or more of the computing devices of FIG. 1 (including the media storage device 108) have the general architecture shown in FIG. 2, in various embodiments. The device depicted in FIG. 2 includes a processor 152 (e.g., a microprocessor, controller, or application-specific integrated circuit), a primary memory 154 (e.g., volatile memory, random-access memory), a secondary memory 156 (e.g., non-volatile memory, solid state drive, hard disk drive), user input devices 158 (e.g., a keyboard, mouse, or touchscreen), a display 160 (e.g., an organic, light-emitting diode display), and a network interface 162 (which may be wired or wireless). The memories 154 and 156 store instructions and data. The processor 152 executes the instructions and uses the data to carry out various procedures including, in some embodiments, the methods described herein.

Each of the elements of FIG. 2 is communicatively linked to one or more other elements via one or more data pathways 163. Possible implementations of the data pathways 163 include wires, conductive pathways on a microchip, and wireless connections. In an embodiment, the processor 152 is one of multiple processors in the computing device, each of which is capable of executing one or more separate threads. In an embodiment, the processor 152 communicates with other processors external to the computing device in order to initiate the execution of different threads on those other processors.

The term "local memory" as used herein refers to one or both the memories 154 and 156 (i.e., memory accessible by the processor 152 within the computing device). In some embodiments, the secondary memory 156 is implemented as, or supplemented by an external memory 156A. The media storage device 108 is a possible implementation of the external memory 156A. The processor 152 executes the instructions and uses the data to carry out various procedures including, in some embodiments, the methods described herein, including displaying a graphical user interface 169. The graphical user interface 169 is, according to one embodiment, software that the processor 152 executes to display a report on the display device 160, and which permits a user to make inputs into the report via the user input devices 168.

The computing devices of FIG. 1 (i.e., the processor 152 of each of the computing devices) are able to communicate with other devices of FIG. 1 via the network interface 162 over the network 152. In an embodiment, this communication takes place via a user interface that the productivity server 150 provides to the computing devices 154a, 154b, and 154c. The specific nature of the user interface and what the user interface shows at any given time may vary depending what the user has chosen to view. Also, multiple users may interact with different instances of the user interface on different devices. In some embodiments, the productivity server 150 carries out calculations to determine how content is to be rendered on a computing device, generates rendering instructions based on those calculations, and transmits those rendering instructions to the computing device. Using the received instructions, the computing device renders the content on a display. In other embodiments, the productivity server 150 transmits instructions regarding an asset to a computing device. In carrying out the received instructions, the computing device performs the appropriate calculations locally to render the content of the asset on a display.

Figure 9:
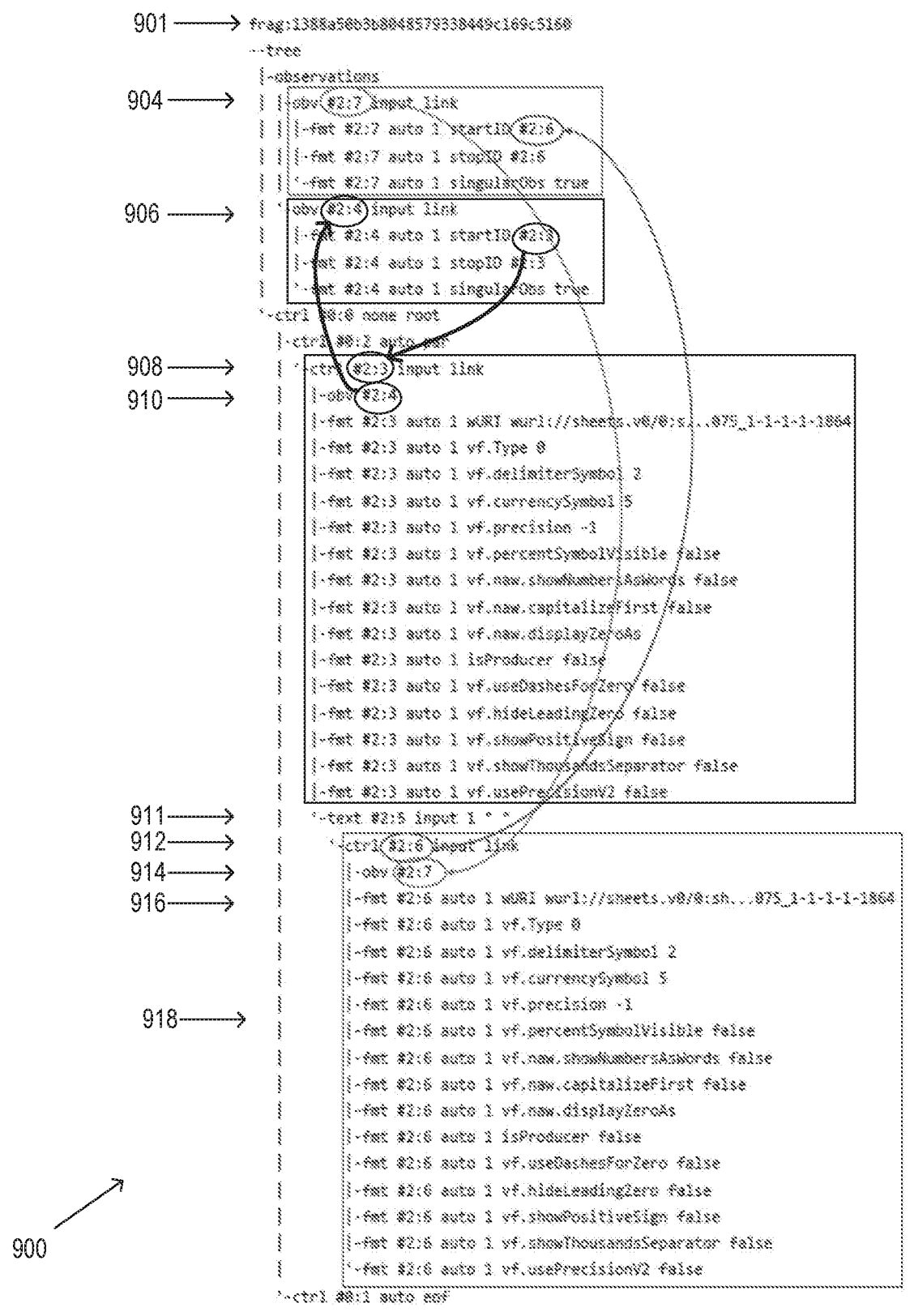

Causal tree structures are useful representations of how content and metadata associated with the content are organized. For example, a document may be represented by a single causal tree structure or a bounded set of causal tree structures. The causal tree structure is useful in efficiently tracking and storing changes made in the document. A typical causal tree structure includes nodes of the editing instructions in the document, and each editing instruction has a unique identifier or ID. The editing instructions include, for example, text characters, insertion of text characters, deletion of text characters, formatting instructions, copy and paste, cut and paste, etc. In other words, a causal tree structure is a representation of all the instructions (regardless of type) that compose a document. The causal tree structure starts with a root node and a collection of observation instances, from which all other instruction nodes branch. Except for the root node and observations, each editing instruction in the document is caused by whichever editing instruction that came before it. Every editing instruction is aware of the ID of its parent instruction, i.e., the instruction that "caused" it. In an embodiment, each instruction (other than the root node and observations) in the document may be represented as a 3-tuple: ID (ID of the instruction), CauseID (ID of the parent instruction), and Value (value of the instruction). Observations have a 3-tuple: ID (ID of the instruction), Start ID (ID of the first character in a range), and Stop ID (ID of character immediately after the last character in a range unless the same as the Start ID which indicates only a single character is to be observed). Additional instructions may be added to an observation to provide additional information or to modify the range being observed. An example causal tree structure is shown in FIG. 9.

FIG. 3 is a screen shot diagram of a user interface 300 illustrating a portion of a first document 302 having a table with a plurality of cells, according to an embodiment. FIG. 4 is a screen shot diagram illustrating a user interface 400 illustrating a portion of a second document 402 having a first set of content 404 to be linked to the first document of FIG. 3, according to an embodiment. In various embodiments, the first document 302 is displayed within the user interface 300 to a user, for example, within the client software 105a on the computing device 104a to the user 120. Similarly, the second document 402 is displayed within the user interface 400 to the user 120 within the client software 105a. In some scenarios, the first document 302 and/or second document 402, or respective portions thereof, are displayed to different users within several different user interfaces on different computing devices, for example, client software 105b and 105c and computing devices 104b and 104c.

In the example shown in FIG. 3, the first document 302 is a spreadsheet and the user interface 300 displays a plurality of cells that includes cells A16 through C37 of the spreadsheet. In the example shown in FIG. 4, the second document 402 is also a spreadsheet and the user interface 400 displays a plurality of cells that includes cells C50 through D54 of the spreadsheet. In other embodiments, the first document 302 and/or second document 402 include more or fewer cells than those shown in FIGS. 3 and 4, but for clarity and conciseness, only a portion of the documents are shown. In the embodiments described herein, for explanatory purposes, the cell A31 is a portion of the document 302 into which a user inserts linked content and is referred to herein as a "destination" or "destination location." Although a cell is described as the portion of a document into which linked content is inserted, in other embodiments, the portion of the document is i) a paragraph or other element of a document that contains text, ii) a field or text box of a presentation, iii) or other suitable portion of a document.

The linked content is content from a different location, for example, a different location within the first document 302 or a location that is external to the first document 302. For example, the linked content is content that is part of another document, or another spreadsheet within a workbook, etc. Rather than have the same content manually entered and updated in different locations, which increases a likelihood of error and inconsistent values, linked content is utilized to pull the content directly from a single source when the first document 302 is to be displayed. As used herein, a link is a reference, pointer, or data structure that refers to the linked content (or the location of the linked content), while the linked content is a set of content, for example, a set of one or more characters or numbers, a set of one or more sentences, a set of one or more paragraphs, a set of one or more cells within a spreadsheet, a set of one or more images, or various combinations thereof. In an embodiment, the linked set of content contains a plurality of elements (i.e., characters, cells, paragraphs, etc.) that appear consecutively within a document, for example, cells A4 through A7 of a spreadsheet or sentences one through five of a text document. In another embodiment, the linked set of content contains a plurality of elements that do not appear consecutively, for example, cells B18:C20 of a spreadsheet (i.e., cells B18, B19, B20, C18, C19, and C20).

Referring to FIGS. 3 and 4, the user 120 edits the cell A31 of the first document 302 to contain a first link at a location 304, referred to herein as link 304. The link 304 refers to a first set of content 404 that is external to the cell (in this example, within the second document 402), according to an embodiment. The second computing device 104a receives a first user entry of the first link 304 in the cell A31, for example, via the client software 105a. In various embodiments, the client software 105a is configured to provide a user interface where the user 120 i) selects a source location of the first set of content from which the linked content should be retrieved, and ii) selects a destination location within the first document 302 at which the first link is to be processed (i.e., a location where the linked content should be inserted). For example, the user 120 selects (e.g., highlights) the first set of content 404 in document 204 (the source destination) to perform a copy gesture or action, and then pastes the first content 404 into the destination location in cell A31 of document 302, where the paste gesture or action may insert the link directly or provide a menu (e.g., pop-up menu, drop-down menu) with an option to insert the link. Although the description above refers to selecting the source location before the destination location, in other embodiments, the user selects the destination location before selecting the source location. In an embodiment, the client software 105a provides a user interface where the user 120 performs a gesture at a location in the cell A31 (e.g., a right-click of a mouse button, a "shift" or "control" click, a keyboard shortcut, etc.) where the first link should be inserted and a menu is provided (e.g., pop-up menu, drop-down menu) with an option to insert the link. The user then navigates to the desired document and selects (e.g., clicks), highlights (e.g., clicks and drags), or otherwise identifies the first set of content, specifically, the value of "1,770,000" in cell D53 of document 402. In this way, the user does not need to manually edit the cell to write in a formula that references a different cell and the formula is not visible to the user.

FIG. 5 is a screen shot diagram of a user interface 500 illustrating the first document 302 of FIG. 3 with the first set of content linked from the second document of FIG. 4, according to an embodiment. In various embodiments, the first document 302 is displayed within the user interface 500 to a user, for example, within the client software 105a on the computing device 104a to the user 120. In the user interface 500, computing device 104a displays the cell A31 in the first document 302 with the linked content. In an embodiment, the computing device 104a retrieves the first set of content 404 from the second document 402 (e.g., from the media storage device 108) using the first link 304 and updates the user interface 500 to display the first set of content 404 within the cell A31 as linked content 504.

As shown in FIGS. 4 and 5, the display format of the first set of content as shown in the source location (FIG. 4: "1,770,000") is different from the display format of the first set of content as shown in the destination location (FIG. 5: "1.77 billion"). In various embodiments, the computing device 104a is configured to provide a user interface that allows the user to change the display format associated with the first set of content (and other elements in the documents) and provide separate display formats for the destination locations. In some scenarios, each destination location of a set of content may have a different display format from the other destination locations. In FIG. 4, the display format is comma delimited and in units of thousands of shares of stock and thus the actual numerical value is 1,770,000,000. In FIG. 5, the display format includes two decimal points and units of billions of shares, with the prefix displayed as text. Other display format variations will be apparent to those skilled in the art, for example, such as different number formats (decimal locations, currency symbols, delimiters, units, etc.), different date formats (Month-Day-Year with leading zeros, Day-Month-Year without leading zeros, Month name-Day-Year with no leading zeros, etc.), or different text formats (font face, font size, bold or underlining, etc.). In some embodiments, the client software 105a retrieves a linked set of content as plain text (i.e., without formatting) and displays the linked set of content using an selected display format for the destination location.

In some embodiments, the computing device 104a is configured to display the first set of content, as well as other linked content, with a display format that includes a link indicator adjacent to the first set of content. The link indicator provides a visual indication in the user interface 500 that the first set of content is linked from a source location that is external to the first document 302. In the embodiment shown in FIG. 5, the link indicator is shown as underlining of the first set of content. In other embodiments, another suitable link indicator is used, for example, a different font color or font face, a different background color, a box that surrounds the link, etc. In an embodiment, the link indicator is an underline when the set of content is a numerical value and is a box that surrounds the set of content when the set of content is a text value.

In various embodiments, the client software 105a is configured to allow the user 120 to edit the cell A31 to contain the linked content 504 and also one or more second sets of content, where the second sets of content may be text, numbers, other linked content (i.e., from a different source location), or other suitable content. In an embodiment, the computing device 104a retrieves the first set of content 404 from the second document 402 using the first link 304, retrieves the second set of content using the second link, and updates the user interface 500 to display, within the cell A31, the linked content 504 and the second set of content. Generally, the second set of content is distinct from the first set of content. As shown in FIG. 5, the cell A31 includes nine sets of content that are linked content, along with other text content. The nine sets of linked content are "1", "1.77", "Sep. 30, 2019", "1.749", "Sep. 30, 2018", "1.511", "Sep. 30, 2019", "1.45", and "Sep. 30, 2018". In an embodiment, the remaining text in the cell A31 is stored as a single string of text and the linked content is displayed interleaved with the single string during rendering. In another embodiment, the remaining text in the cell A31 is stored as separate strings that separate each of the linked sets of content and are concatenated during rendering. In yet another embodiment, the content of the cell A31 is stored as a causal tree, as described below with respect to FIG. 9.

Figure 6:
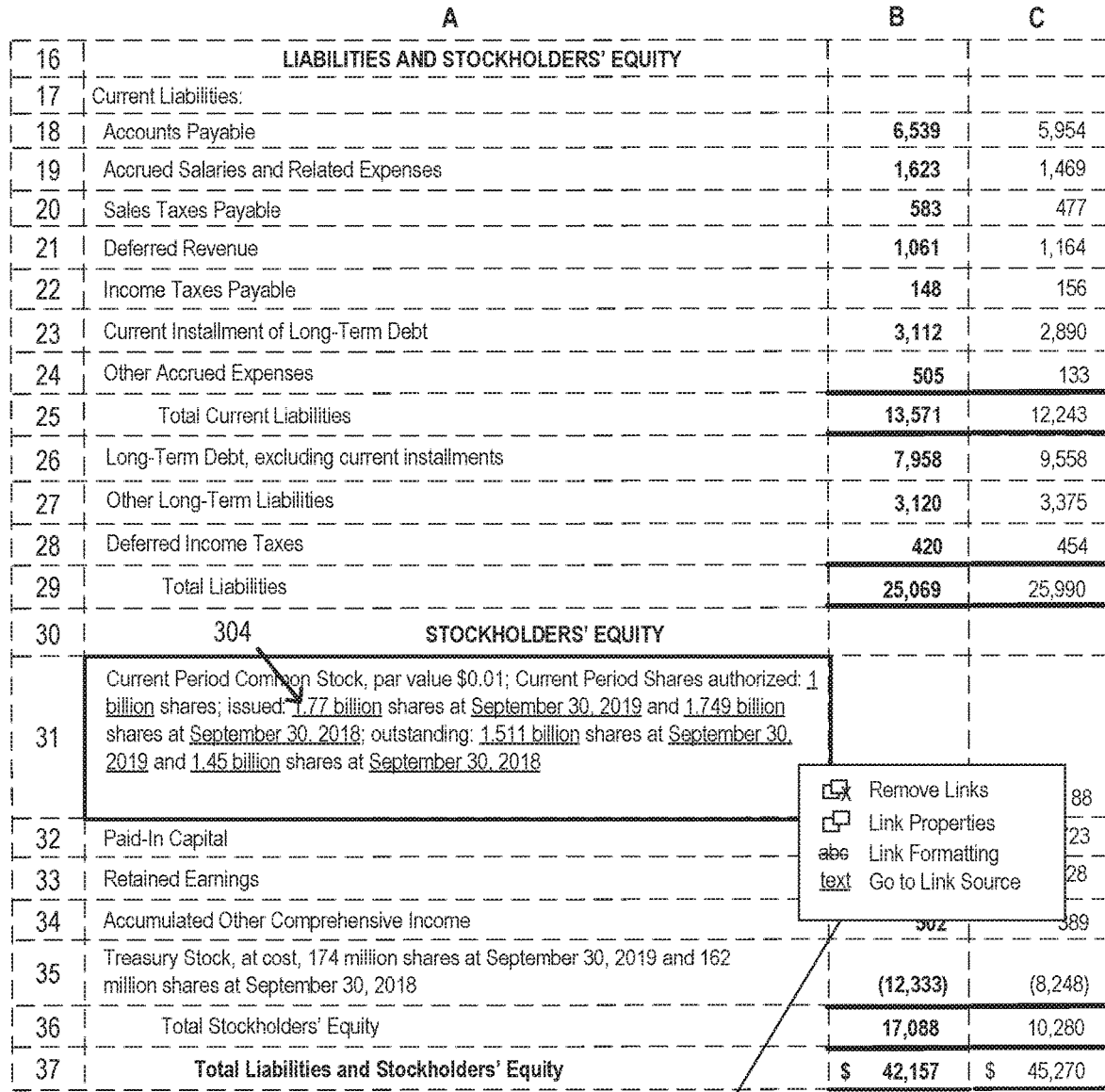
FIG. 6 is a screen shot diagram of a user interface illustrating the first document of FIG. 3 with a link dialog box, according to an embodiment.

FIG. 6 is a screen shot diagram of a user interface 600 illustrating the first document 302 of FIG. 3 with a link dialog box 610, according to an embodiment. The link dialog box 610 provides options to a user for managing existing links within a cell, for example, removing links within the cell ("Remove Links"), displaying more detailed link properties ("Link Properties"), displaying options for changing the display format of the links ("Link Formatting"), and updating the user interface to display the document that contains the source location for a link ("Go to Link Source").

FIG. 7 is a screen shot diagram of a user interface 700 illustrating the first document 302 of FIG. 3 with a link properties box 710, according to an embodiment. The client software 105a displays the link properties box 710 after a user has selected the "Link Properties" option shown in FIG. 6. The link properties box 710 displays a list of the sets of linked content within a selected cell. In the embodiment shown in FIG. 7, the link properties box 710 includes a list of the nine sets of linked content that are contained in cell A31 (some are not shown, but are accessible via a scroll bar in the example of FIG. 7). The link properties box 710 provides an improved visualization of the linked content within the cell, for example, by omitting the surrounding text that may obscure the display format of the linked content. In an embodiment, each entry in the list is selectable to provide a drop-down menu with more detail of the selected entry.

FIG. 8 is a screen shot diagram of a user interface 800 illustrating the first document 302 of FIG. 3 with the link properties box 710 of FIG. 7, according to an embodiment. In the example shown in FIG. 8, a user has selected an entry 712 of FIG. 7, after which the client software 105a displays the link properties box 810 with more detail of the entry 712 ("1.77", corresponding to the first set of content 404). The link properties box 810 includes a source link 812 and a destination link 814. The source link 812 includes a document name ("SEC Reporting SS-9.30.2019") of the source location, a document element (cell "D53" of the document) of the source location, a section name ("Dates and General") of the source location, and an icon that indicates a document type of the source location. In other embodiments, additional or fewer details are provided in the source link 812, for example, source formatting, last edited time, or other suitable details. In some embodiments, the client software 105*a* is configured to include a link (e.g., a universal resource locator) to the source location in the source link 812 that allows the user to quickly open the source document (e.g., in a separate window).

The destination link 814 includes a list of documents in which the content 404 appears. In the embodiment shown in FIG. 8, only a single destination location is shown, but in other embodiments where a set of content is linked from multiple different documents, those additional documents are shown. The destination link 814 includes a document name ("ABC 10-K") of the destination location, a document element (cell "A31" of the document) of the destination location, a section name ("Consolidated Balance . . . ") of the destination location, and an icon that indicates a document type of the source location (e.g., spreadsheet, text document, presentation, etc.). In other embodiments, additional or fewer details are provided in the destination link 814, for example, source formatting, last updated time, or other suitable details.

FIG. 9 is a diagram of an example symbolic representation of a causal tree 900 that includes a linking data structure, according to an embodiment. The causal tree 900 is itself a data structure that comprises a sequence of editing instructions associated with a particular cell or other document element. In some embodiments, each editing instruction is assigned an identifier unique to such editing instruction. For example, when the client software 105*a* receives a user editing instruction for a document (e.g., the document 302), the user editing instruction is assigned an identifier that is unique to the user editing instruction and the user editing instruction is stored as an additional node to the causal tree 900. In an embodiment, a set of content includes a plurality of alphanumeric characters that are collectively represented in the causal tree 900 as a single character that is replaced by the plurality of alphanumeric characters when displayed in the user interface. In the embodiment shown in FIG. 9, various editing instructions are organized as "characters" and are assigned an identifier, for example, an observation character 904 ("obv") has an identifier "#2:7", a text character 911 has an identifier "#2:5", a control character 912 ("ctrl") has as an identifier "#2:3", and so on.

In some embodiments, a cell of a spreadsheet or other document element is stored in the media storage device 108 with a fragment number value that corresponds to a fragment number 901 that identifies the causal tree 900. In other embodiments, the causal tree 900 is itself stored within the document element in the media storage device 108. When rendering a document, the client software 105*a* obtains the causal tree 900 for the document element and traverses the tree to render that particular document element.

In the present disclosure, when the user 120 enters a user entry of a first link in a cell, for example, the first link 304 to the first content 404, the client software 105*a* is configured to insert a uniform resource identifier (URI), which identifies a source location of the first set of content 404, into the causal tree that represents a history of edits to the cell, according to an embodiment. In other embodiments, a different resource locator is utilized. When inserting the first URI into the causal tree, the client software 105*a* is configured to insert a first linking data structure configured to identify i) the first link, ii) the first set of content, and iii) a destination location within the first document at which the first link is to be processed. The first linking data structure is associated with an external linking system configured to monitor changes to source locations and destination locations. In an embodiment, for example, the productivity server 100 includes the external linking system and is configured to monitor changes to the source locations and destination locations.

The causal tree 900 includes two observation instances 904 and 906. The observation instance 904 includes an identifier (#2:7), a start character identifier (#2:6), and a stop character identifier (#2:6). In this example the start identifier and stop identifier identify a control character 912 within the causal tree that represents the linked content associated with a link 304 (i.e., a destination location within the document). The start and stop identifiers can observe a range of characters or a single character such as the example case 900 for a link. Specifically, the control character 912 has a character identifier (#2:6) that corresponds to the start identifier of the observation instance 904. The control character 912 is a link character that corresponds to a first link, for example, the first link 304. The control character 912 further includes a reference indicator 914 to the corresponding observation (obv #2:7), a URI 916 that identifies the source location of the linked content, and one or more formatting characters 918 that identify a display format of the linked content. In an embodiment, when rendering a document element, the observation instances 904 and 906 are provided to the external linking system to indicate that any changes to the associated characters should be provided for updating the user interface. In some embodiments, the client software 105*a* receives a notice of a change to the first set of content from the external linking system and automatically updates the user interface to display the change to the first set of content. In an embodiment, for example, the external linking system sends the updated content directly to the client software 105*a* when the change occurs. In another embodiment, for example, the external linking system sends the notice without the updated content and the client software 105*a* subsequently sends a request for the updated content.

Figure 10:
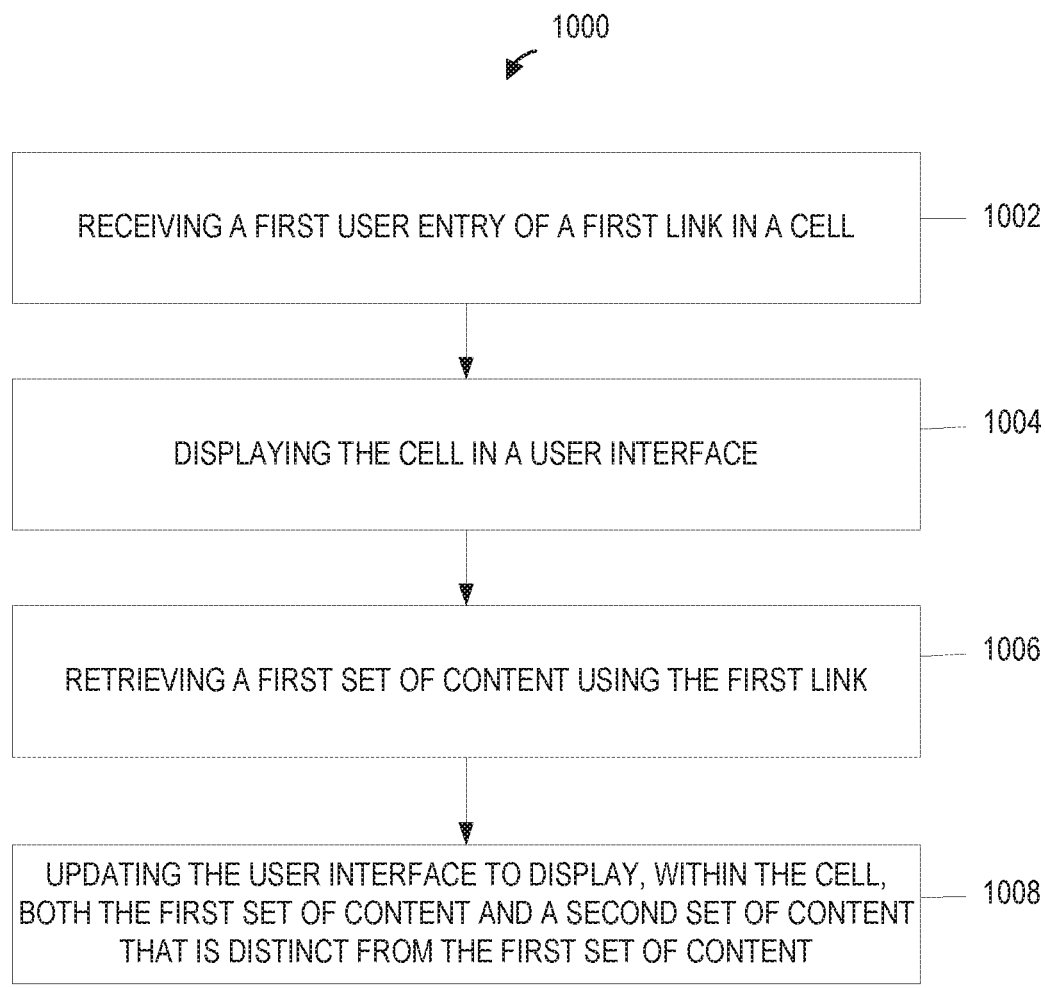
FIG. 10 is a flowchart illustrating an example method, implemented on a server, for rendering linked content in a first document having a table with a plurality of cells, according to an embodiment.

FIG. 10 is a flowchart illustrating an example method 1000, implemented on a server, for rendering linked content in a first document having a table with a plurality of cells, according to an embodiment. In some embodiments, the method 1000 is implemented by the productivity server 100 of FIG. 1, which interacts with the database server 106 and the client devices 104. FIG. 10 is described with reference to FIG. 1 for explanatory purposes. In other embodiments, however, the method 1000 is implemented by another suitable computing device.

At block 1002, a first user entry of a first link in a cell of the plurality of cells is received by a computing device. The first link refers to a first set of content having a source location that is external to the cell. In an embodiment, the first link corresponds to the first link 304 (FIG. 3) and the first set of content is the first content 404 of the document 402 (FIG. 4). In some embodiments, inserting a link is functionally different from inserting a formula or code that references another cell. For example, instead of a user manually editing the cell to write in a formula that references a different cell or, for example, writing in the control character 912 of FIG. 9, the user merely selects the location at which the linked content should be inserted, indicates that a link is desired (e.g., with a gesture or right-click), and selects the content to be linked. Advantageously, the user does not need to have knowledge of a formula or code that references the different cell (i.e., syntax of the formula) and any underlying code or data structure that supports the reference is not visible to the user.

At block 1004, the cell is displayed in a user interface that displays the first document. In an embodiment, the cell corresponds to the cell A31 shown in FIG. 5 and the user interface corresponds to the user interface 500. In some scenarios, the first document contains a table having the plurality of cells. In an embodiment, displaying the cell includes displaying the cell in an editing mode of the user interface for the cell, including updating the user interface to display, within the cell, both the first set of content and the second set of content without displaying the first link within the cell while in the editing mode of the user interface (i.e., without displaying a formula or data structure that causes the linked content to be retrieved). As an example, the editing mode is a mode where the user is actively able to change the value within the cell by providing input, for example, by typing in numbers on a keyboard (i.e., input device 158). In some embodiments, the user enters the editing mode by double-clicking on a cell.

At block 1006, the first set of content is retrieved using the first link. In an embodiment, for example, the client software 105a is configured to retrieve the content 404 from the media storage device 108. In some scenarios, the first set of content is retrieved from the first document, for example, in a different cell or section of the first document. In other scenarios, the first set of content is retrieved from a second document that is different from the first document. The second document may be a spreadsheet document (e.g., a document having a table with a plurality of cells), or a non-spreadsheet format document, for example, a text document, presentation document, or other suitable document.

At block 1008, the user interface is updated to display, within the cell, both the first set of content and a second set of content that is distinct from the first set of content. In an embodiment, for example, the user interface 300 is updated to the user interface 500 to display the first content 504 ("1.77") along with the second set of content, specifically, the remaining content of the cell A31.

In an embodiment, updating the user interface includes displaying the first set of content with a first display format that is different from a second display format, where the second display format corresponds to a display of the first set of content in a second document, wherein the second document is distinct from the first document.

In an embodiment, retrieving the first set of content using the first link includes retrieving the first set of content as plain text and displaying the first set of content with the first display format comprises formatting the plain text using the first display format.

In some embodiments, the method 1000 also includes receiving a notice of a change to the first set of content and automatically updating the user interface to display the change to the first set of content.

In an embodiment, the method 1000 also includes displaying a link properties box in the user interface, for example, the link properties box 710 (FIG. 7) or link properties box 810 (FIG. 8). The link properties box i) includes a list of sets of linked content within the cell, the list of sets including the first set of linked content, and ii) identifies source locations of the first set of content and destination locations of the first set of content.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments of the disclosure. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the disclosure pertains may easily implement functional programs, codes, and code segments for making and using the disclosure.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosure may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description of the disclosure but by the following claims, and all differences within the scope will be construed as being included in the disclosure.

No item or component is essential to the practice of the disclosure unless the element is specifically described as "essential" or "critical". It will also be recognized that the terms "comprises", "comprising", "includes", "including", "has", and "having", as used herein, are specifically intended to be read as open-ended terms of art. The use of the terms "a" and "an" and "the" and similar referents in the context of describing the disclosure (especially in the context of the following claims) are to be construed to cover both the singular and the plural, unless the context clearly indicates otherwise. In addition, it should be understood that although the terms "first", "second", etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method for rendering linked content in a first document having a table with a plurality of cells, the method comprising:
   receiving, at a computing device, a first user entry of a first link in a cell of the plurality of cells, wherein i) the first link refers to a first set of content to be displayed in the cell and having a source location that is external to the cell, and ii) before the first link is added to the cell, the cell includes a second set of content that is distinct from the first set of content when displayed;
   adding, by the computing device, the first link to the cell, comprising inserting a first uniform resource identifier, which identifies the source location of the first set of content, into a node of a causal tree that represents a history of edits to the cell, wherein nodes of the causal tree represent editing instructions for the cell and include nodes for the second set of content;
   displaying, by the computing device, the cell in a user interface that displays the first document, including:
   traversing, by the computing device, the causal tree to render the cell;
   retrieving, by the computing device, the first set of content from the source location using the first uniform resource identifier from the cell; and
   updating, by the computing device, the user interface to display, within the cell, both the first set of content and the second set of content that is distinct from the first set of content,
   wherein updating the user interface comprises displaying the first set of content with text that is presented in a first display format of the first document that is different from text that is presented in a second display format of a second document, text that is presented in the second display format corresponds to a display of the first set of content in the second document, wherein the second document is distinct from the first document.

2. The method of claim 1, wherein:
   retrieving the first set of content using the first uniform resource identifier includes retrieving the first set of content as plain text; and
   displaying the first set of content with the first display format comprises formatting the plain text using the first display format.

3. The method of claim 1, wherein retrieving the first set of content using the first uniform resource identifier includes retrieving the first set of content from the second document.

4. The method of claim 3, wherein the first document contains a table having the plurality of cells and the second document is a non-spreadsheet format document.

5. The method of claim 1, further comprising displaying, by the computing device, a link properties box in the user interface, wherein the link properties box i) includes a list of sets of linked content within the cell, the list of sets including the first set of linked content, and ii) identifies source locations of the first set of content and destination locations of the first set of content.

6. The method of claim 1, wherein displaying the cell in the user interface that displays the first document comprises displaying the cell in an editing mode of the user interface for the cell, including updating the user interface to display, within the cell, both the first set of content and the second set of content without displaying the first uniform resource identifier within the cell while in the editing mode of the user interface.

7. The method of claim 6, wherein updating the user interface to display, within the cell, both the first set of content and the second set of content without displaying the first uniform resource identifier within the cell while in the editing mode of the user interface comprises displaying a first link indicator adjacent to the first set of content, wherein the first link indicator provides a visual indication in the user interface that the first set of content is linked from the source location that is external to the cell.

8. The method of claim 7, wherein the first link indicator is an underline of the first set of content when the first set of content is a numerical value and is a box that surrounds the first set of content when the first set of content is a text value.

9. The method of claim 1, wherein:
   inserting the first uniform resource identifier into the causal tree comprises inserting into the causal tree a first linking data structure configured to identify i) the first uniform resource identifier, ii) the first set of content, and iii) a destination location within the first document at which the first uniform resource identifier is to be processed; and the first linking data structure is associated with an external linking system configured to monitor changes to source locations and destination locations.

10. The method of claim 1, wherein the first set of content includes a plurality of alphanumeric characters that are collectively represented in the causal tree as a single character that is replaced by the plurality of alphanumeric characters when displayed in the user interface.

11. The method of claim 1, wherein the source location of the first set of content is external to the first document.

12. The method of claim 1, wherein the source location of the first set of content is a different cell in the first document.

13. The method of claim 1, the method further comprising:
receiving, by the computing device, a notice of a change to the first set of content; and
automatically updating, by the computing device, the user interface to display the change to the first set of content, including retrieving, by the computing device, the first set of content using the first uniform resource identifier from the cell.

14. The method of claim 1, further comprising:
receiving, by the computing device, a notification of a change to the first set of content from an external linking system configured to monitor changes to source locations and destination locations; and
updating, by the computing device, the user interface to display, within the cell, the change to the first set of content.

15. The method of claim 1, wherein the first display format of the first document and the second display format of the second document are one or more of i) different number formats, ii) different date formats, and iii) different text formats.

16. A computing device comprising a processor, wherein the processor is configured to carry out a method for rendering linked content in a first document having a table with a plurality of cells, the method comprising:
receiving, at the computing device, a first user entry of a first link in a cell of the plurality of cells, wherein i) the first link refers to a first set of content to be displayed in the cell and having a source location that is external to the cell, and ii) before the first link is added to the cell, the cell includes a second set of content that is distinct from the first set of content when displayed;
adding, by the computing device, the first link to the cell, comprising inserting a first uniform resource identifier, which identifies the source location of the first set of content, into a node of a causal tree that represents a history of edits to the cell, wherein nodes of the causal tree represent editing instructions for the cell and include nodes for the second set of content;
displaying, by the computing device, the cell in a user interface that displays the first document, including:
traversing, by the computing device, the causal tree to render the cell;
retrieving, by the computing device, the first set of content using the first uniform resource identifier from the cell; and
updating, by the computing device, the user interface to display, within the cell, both the first set of content and the second set of content that is distinct from the first set of content,
wherein updating the user interface comprises displaying the first set of content with text that is presented in a first display format of the first document that is different from text that is presented in a second display format of a second document, text that is presented in the second display format corresponds to a display of the first set of content in the second document, wherein the second document is distinct from the first document.

17. The computing device of claim 16, wherein:
retrieving the first set of content using the first uniform resource identifier includes retrieving the first set of content as plain text; and
displaying the first set of content with the first display format comprises formatting the plain text using the first display format.

18. The computing device of claim 16, wherein retrieving the first set of content using the first uniform resource identifier includes retrieving the first set of content from the second document.

19. The computing device of claim 16, wherein the first document contains a table having the plurality of cells and the second document is a non-spreadsheet format document.

20. The computing device of claim 16, wherein the method carried out by the processor further comprises displaying, by the computing device, a link properties box in the user interface, wherein the link properties box i) includes a list of sets of linked content within the cell, the list of sets including the first set of linked content, and ii) identifies source locations of the first set of content and destination locations of the first set of content.

21. The computing device of claim 16, wherein displaying the cell in the user interface that displays the first document comprises displaying the cell in an editing mode of the user interface for the cell, including updating the user interface to display, within the cell, both the first set of content and the second set of content without displaying the first uniform resource identifier within the cell while in the editing mode of the user interface.

22. The computing device of claim 21, wherein updating the user interface to display, within the cell, both the first set of content and the second set of content without displaying the first uniform resource identifier within the cell while in the editing mode of the user interface comprises displaying a first link indicator adjacent to the first set of content, wherein the first link indicator provides a visual indication in the user interface that the first set of content is linked from the source location that is external to the cell.

23. The computing device of claim 22, wherein the first link indicator is an underline of the first set of content when the first set of content is a numerical value and is a box that surrounds the first set of content when the first set of content is a text value.

24. The computing device of claim 16, wherein:
inserting the first uniform resource identifier into the causal tree comprises inserting into the causal tree a first linking data structure configured to identify i) the first uniform resource identifier, ii) the first set of content, and iii) a destination location within the first document at which the first uniform resource identifier is to be processed; and
the first linking data structure is associated with an external linking system configured to monitor changes to source locations and destination locations.

25. The computing device of claim 16, wherein the first set of content includes a plurality of alphanumeric characters that are collectively represented in the causal tree as a single character that is replaced by the plurality of alphanumeric characters when displayed in the user interface.

26. The computing device of claim 16, wherein the method carried out by the processor further comprises:

receiving, by the computing device, a notice of a change to the first set of content; and automatically updating, by the computing device, the user interface to display the change to the first set of content, including retrieving, by the computing device, the first set of content using the first uniform resource identifier from the cell.

\* \* \* \* \*